(12) United States Patent
Ko

(10) Patent No.: US 8,246,228 B2
(45) Date of Patent: Aug. 21, 2012

(54) LIGHT GUIDE RING UNIT AND BACKLIGHT MODULE USING THE SAME

(75) Inventor: Chun-Cheng Ko, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 297 days.

(21) Appl. No.: 12/713,347

(22) Filed: Feb. 26, 2010

(65) Prior Publication Data

US 2011/0157899 A1 Jun. 30, 2011

(30) Foreign Application Priority Data

Dec. 28, 2009 (TW) .............................. 98145275 A

(51) Int. Cl.
*F21V 5/02* (2006.01)
*B64D 47/06* (2006.01)
*G09F 13/18* (2006.01)
(52) U.S. Cl. ..................... 362/559; 362/511; 362/620
(58) Field of Classification Search .................. 362/620, 362/555, 559, 511, 540, 545, 311.02, 311.03
See application file for complete search history.

(56) References Cited

U.S. PATENT DOCUMENTS

| | | | |
|---|---|---|---|
| 5,390,436 A * | 2/1995 | Ashall ............................ 40/546 |
| 6,286,970 B1 * | 9/2001 | Egawa et al. ................. 362/608 |
| 6,619,829 B1 * | 9/2003 | Chen ............................. 362/544 |
| 6,641,295 B1 * | 11/2003 | Hu .................................. 362/545 |
| 6,871,988 B2 * | 3/2005 | Gebauer et al. .............. 362/511 |
| 6,874,921 B2 * | 4/2005 | Verlage et al. ................ 362/487 |
| 6,880,945 B2 * | 4/2005 | Knaack et al. ................. 362/26 |
| 6,910,783 B2 * | 6/2005 | Mezei et al. .................. 362/615 |
| 7,025,482 B2 * | 4/2006 | Yamashita et al. ............ 362/511 |
| 7,055,999 B2 * | 6/2006 | Lin ................................ 362/548 |
| 7,144,144 B2 * | 12/2006 | Hsu ............................... 362/543 |
| 7,407,311 B2 * | 8/2008 | Yang ............................. 362/555 |
| 2002/0131275 A1 * | 9/2002 | Yamamoto et al. ........... 362/555 |

FOREIGN PATENT DOCUMENTS

EP 0900694 A2 * 10/1999

* cited by examiner

*Primary Examiner* — Ismael Negron
(74) *Attorney, Agent, or Firm* — Altis Law Group, Inc.

(57) ABSTRACT

A light guide ring unit includes a first annular surface, a second annular surface opposite to the first annular surface and an inner side surface connecting the first annular surface and the second annular surface. The first annular surface defines a plurality of first elongated grooves extending along a radius of the first annular surface. The second annular surface defines a second groove extending along a radius of the second annular surface. The first annular surface receives light from a light source, and the light is reflected by the inner walls of the second groove.

14 Claims, 4 Drawing Sheets

LIGHT GUIDE RING UNIT AND BACKLIGHT MODULE USING THE SAME

BACKGROUND

1. Technical Field

The present disclosure relates to light guides and backlight modules using the same, and particularly, to a light guide ring unit and backlight module using the same.

2. Description of the Related Art

Backlight modules often provide illumination for electronic devices such as an instrument panel, a keyboard or other.

A commonly used backlight module includes a light guide ring unit and a plurality of light emitting diodes. The light guide ring unit includes an annular light incidence surface and an annular light-emitting surface opposite to the light incidence surface. The light emitting diodes are arranged on the annular light incidence surface. The annular light incidence surface receives light emitted from the annular light emitting diodes, the light is propagated in the light guide ring plate, and exits via the annular light-emitting surface. However, the brightness of the annular light-emitting surface located at a distance away from the light emitting diodes is lower than that of the light incidence surface, which is adjacent to the light emitting diodes, such that the brightness of the light guide ring unit is not uniform. In addition, the cost of the backlight module is unduly high due to the requirement for having multiple light emitting diodes.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout several views, and all the views are schematic.

DETAILED DESCRIPTION

Figure 1:
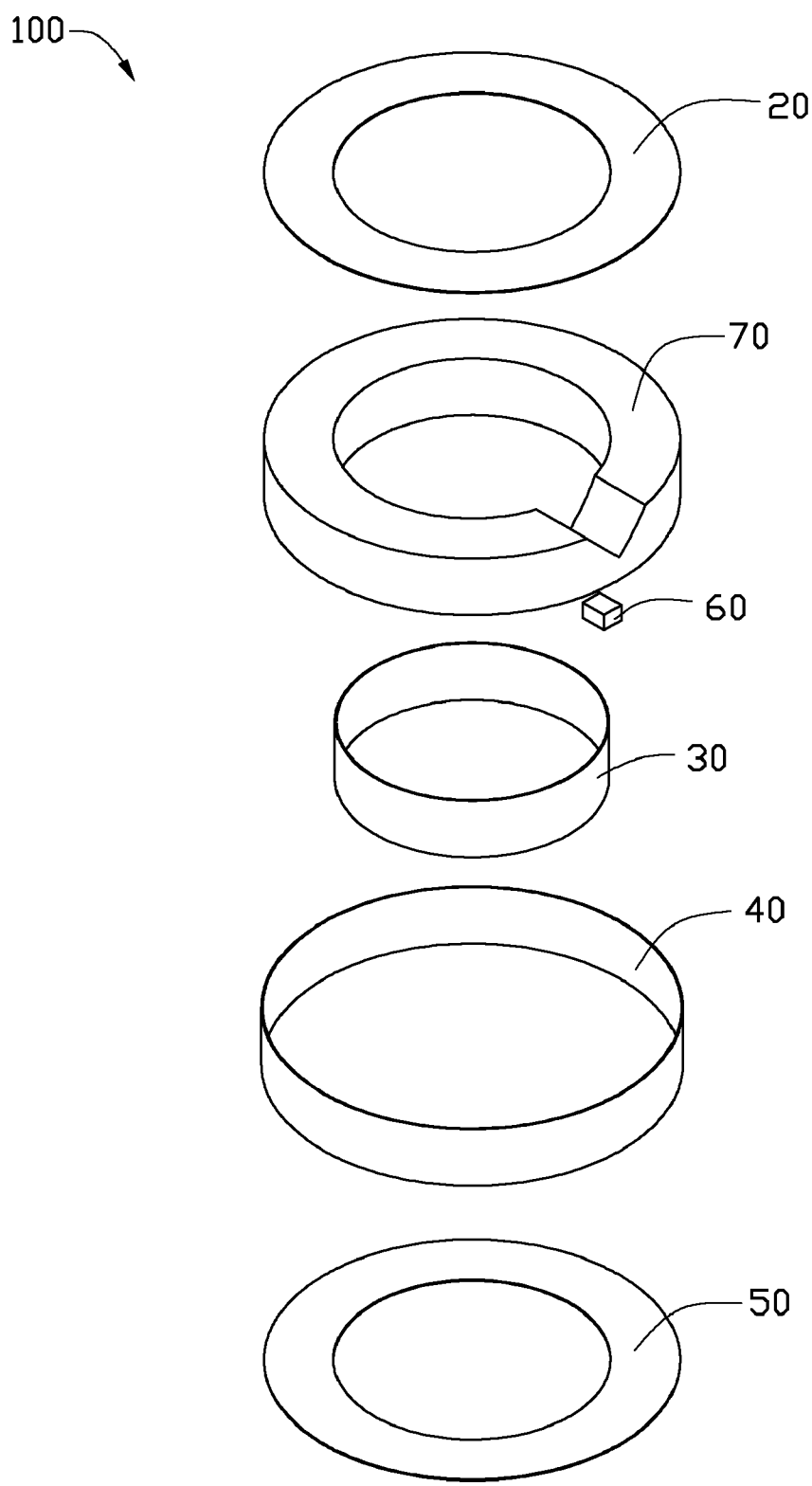
FIG. 1 is an exploded, isometric view of a backlight module as disclosed, including a light guide ring unit and a light source.
Figure 2:
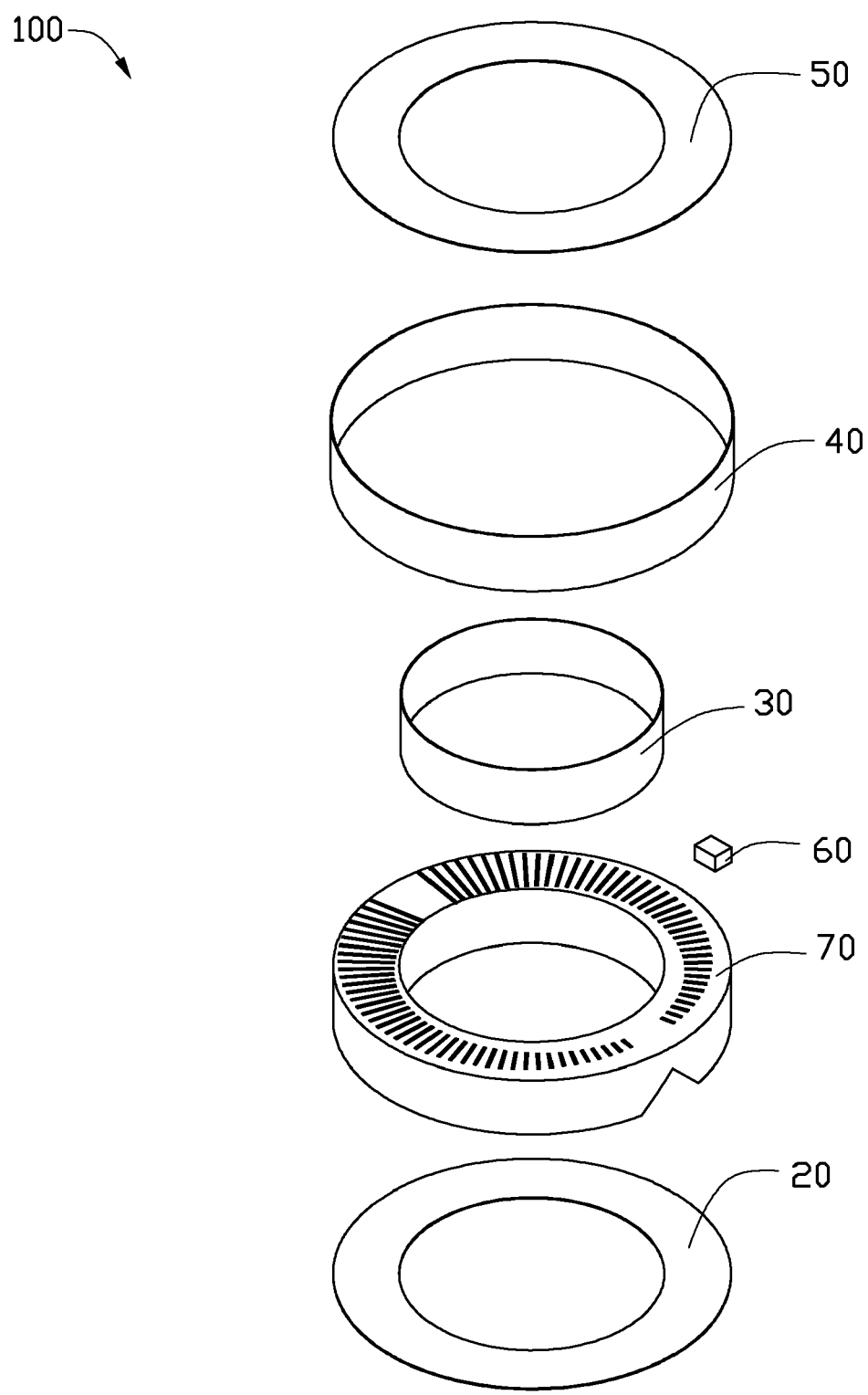
FIG. 2 is similar to the FIG. 1, but viewed from another aspect.

Referring to FIGS. 1 and 2, one embodiment of a backlight 100 as disclosed includes a transparent plate 20, a first reflecting plate 30, a second reflecting plate 40, a third reflecting plate 50, a light source 60 and a light guide ring unit 70. The transparent plate 20, the first reflecting plate 30, the second reflecting plate 40 and the third reflecting plate 50 cooperatively define a receiving portion (not labeled) for receiving the light source 60 and the light guide ring unit 70.

The transparent plate 20 is substantially annular, and can be made of transparent resin or glass.

The first reflecting plate 30 and the second reflecting plate 40 are substantially cylindrical. A diameter of the first reflecting plate 30 is less than that of the second reflecting plate 40.

The third reflecting plate 50 is substantially annular. The inner and outer circumferential edges of the third reflecting plate 50 are connected to a circumferential edge of the first reflecting plate 30 and the second reflecting plate 40, respectively.

Figure 3:
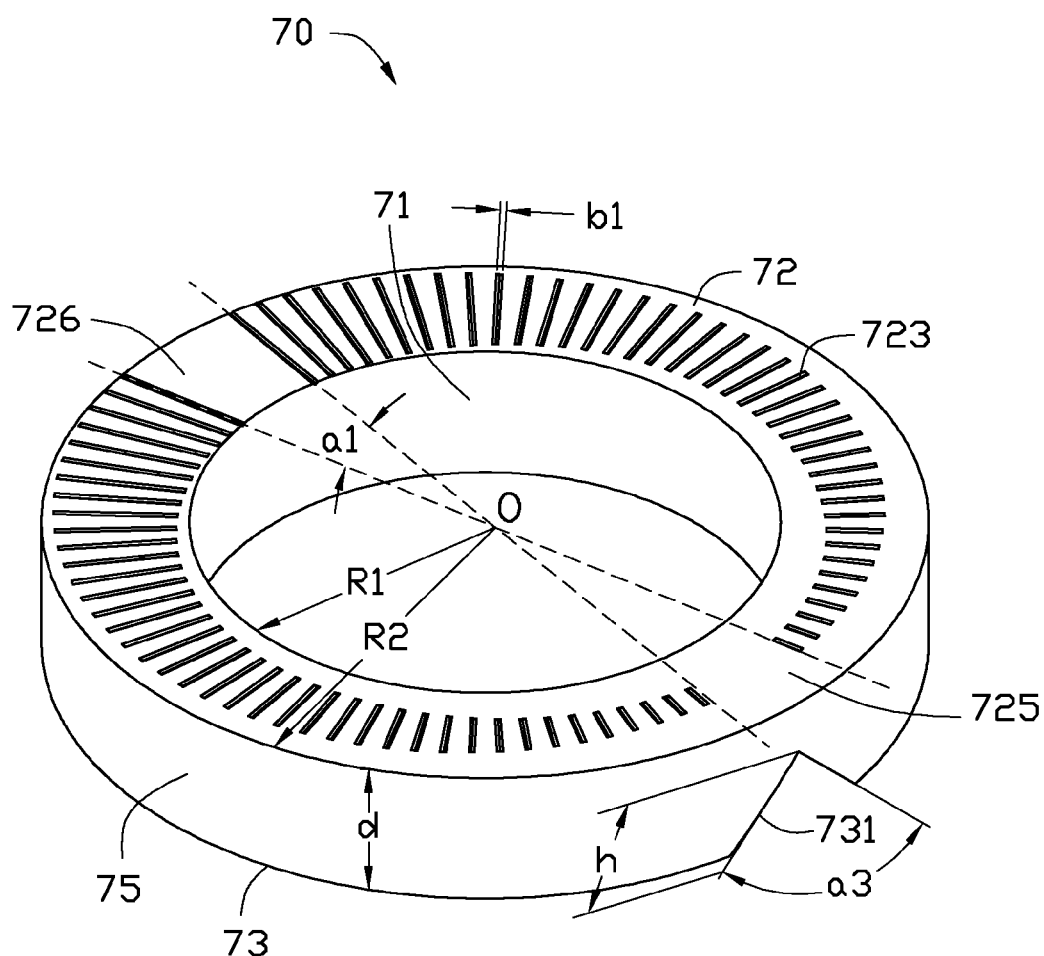
FIG. 3 is an isometric view of a light guide ring unit as disclosed, utilized in a backlight module, such as, for example, that shown in FIG. 1.

Referring to FIG. 3, the light guide ring unit 70 is substantially annular. The light guide ring unit 70 includes an inner side surface 71, a first annular surface 72, a second annular surface 73 and an outer side surface 75. The first annular surface 72 is parallel to the second annular surface 73. The inner side surface 71 is parallel to the outer side surface 75. The inner side surface 71 and the outer side surface 75 are attached to the first annular surface 72 and the second annular surface 73, respectively.

The light guide ring unit 70 defines a plurality of first elongated grooves 723, a light incidence portion 725 and a spacing portion 726 disposed on the first annular surface 72. The first elongated grooves 723 are evenly spaced and arranged on two portions of the first annular surface 72 located between the light incidence portion 725 and the spacing portion 726. Each first elongated groove 723 extends along a radius of the first annular surface 72. The length of the first elongated grooves 723 gradually increases from the light incidence portion 725 to the spacing portion 726. Each first elongated groove 723 is V-shaped, semicircular, or semielliptical. The light incidence portion 725 and the spacing portion 726 are substantially annular. The light incidence portion 725 is disposed at symmetrically opposite to the spacing portion 726.

The light guide ring unit 70 defines a second groove 731 on the second annular surface 73. The second groove 731 extends along the radius of the second annular surface 73, and is opposite to the light incidence portion 725. The second groove 731 V-shaped, semicircular, or semielliptical.

In the illustrated embodiment, the light source 60 is a light emitting diode. The first elongated groove 723 and the second groove 731 are V-shaped. An inner radius R1 of the light guide ring unit 70 is about 10 mm. An outer radius R2 of the light guide ring unit 70 is about 15 mm. A thickness d of the light guide ring unit 70 is about 5 mm. The total number of the first elongated grooves 723 is about 60. An increment of the length of the first elongated groove 723 is about 0.11 mm. A vertex angle of the first elongated groove 723 is about 54.5°. A radian a1 of the light incidence portion 725 is about 10°. A vertex angle a3 of the second groove 731 is about 50°. A breadth b1 of the first elongated grooves 723 is about 0.35 mm. A depth h1 of the second groove 731 is 4.5 mm. The light guide ring unit 70 is of a transparent acrylic resin. A refractive index of the light guide ring unit 70 is about 1.489.

Figure 4:
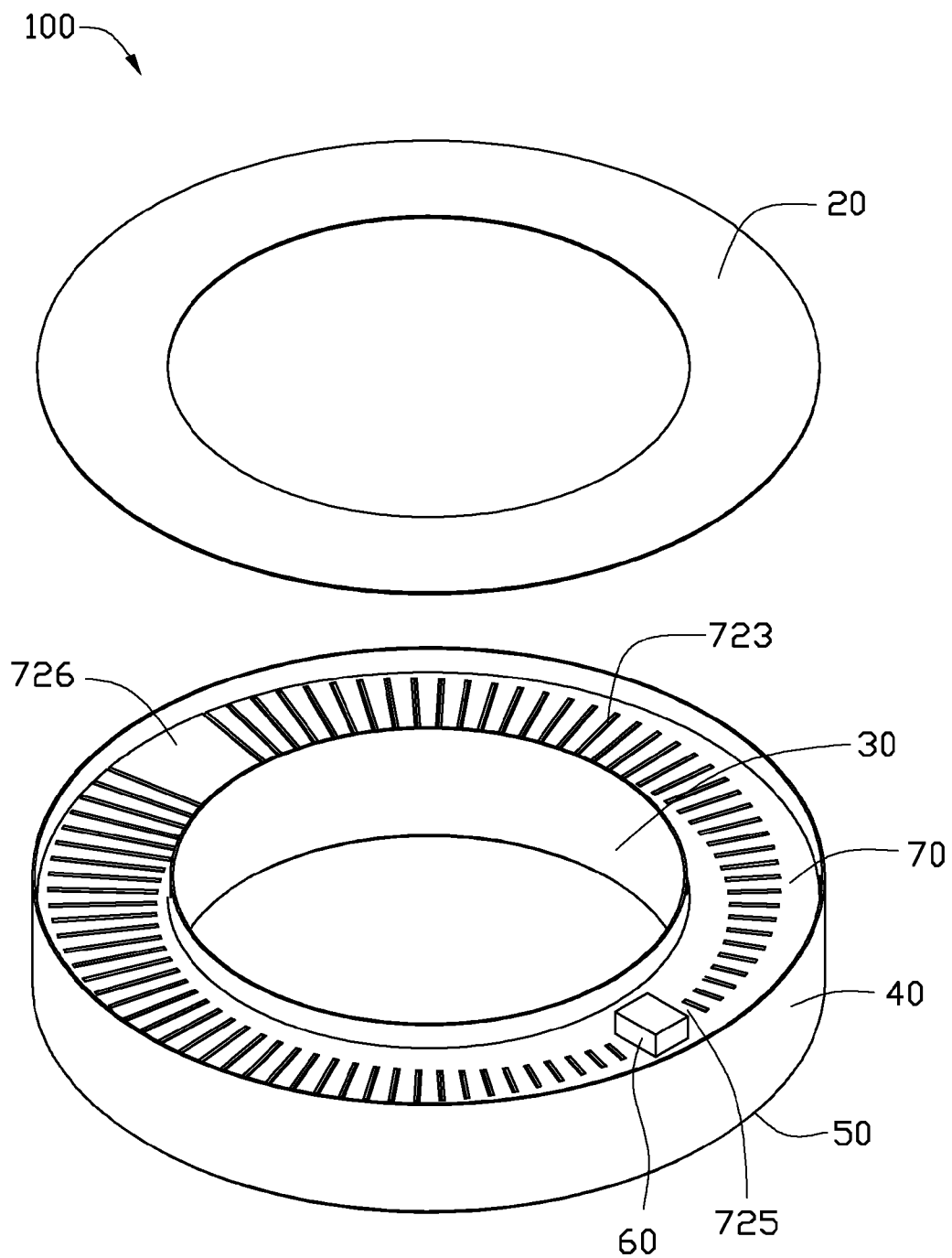
FIG. 4 is an assembled, partial, isometric view of the backlight module shown in FIG. 1.

Referring to FIGS. 1, 3, and 4, during assembly of the backlight module 100, the inner and outer circumferential edges of the transparent plate 20 are respectively connected to the circumferential edges of the first reflecting plate 30 and the second reflecting plate 40, such that the transparent plate 20, the first reflecting plate 30 and the second reflecting plate 40 cooperatively define the receiving portion. The light guide ring unit 70 is received in the receiving portion. The light source 60 is placed opposite to the light incidence portion 725 at the second annular surface 73. The inner and outer circumferential edges of the third reflecting plate 50 are correspondingly connected to the circumferential edges of the first reflecting plate 30 and the second reflecting plate 40, respectively, such that the third reflecting plate 50 covers the receiving portion.

The light incidence portion 725 receives a light from the light source 60, which is reflected by the inner walls of the second groove 731 and is split. The light propagates in the light guide ring unit 70 and is diffused by the first elongated grooves 723. One part of the light exits through the second annular surface 73, and the other part of the light exits through the inner side surface 71, the first annular surface 72 and the outer side surface 75. The other part of the light is reflected by the first reflecting plate 30, the second reflecting plate 40 and the third reflecting plate 50, and is transmitted into the light guide ring unit 70.

The light is reflected by the inner walls of the second groove 731, and is evenly divided when transmitted into the light guide ring unit 70, such that the backlight module 100 requires only to have a few light sources 60 disposed on the light incidence portion 725, such that the overall cost of the backlight module 100 is then conserved. The light is diffused by the plurality of first elongated grooves 723, such that the brightness of the light guide ring unit 70 is more uniform. In addition, the length of the first elongated grooves 723 gradually increases from the light incidence portion 725 to the spacing portion 726, such that the brightness of the light guide ring unit 70 is then much more uniform.

Finally, while the present disclosure has been described with reference to particular embodiments, the description is illustrative of the disclosure and is not to be construed as limiting the disclosure. Therefore, various modifications can be made to the embodiments by those of ordinary skill in the art without departing from the true spirit and scope of the disclosure as defined by the appended claims.

What is claimed is:

1. A light guide ring unit comprising:
a first annular surface;
a second annular surface opposite to the first annular surface; and
an inner side surface connecting the first annular surface and the second annular surface, wherein the first annular surface defines a plurality of first elongated grooves extending along a radius thereof, and the second annular surface defines a second groove extending along a radius thereof;
wherein the first annular surface defines a light incidence portion opposite to the second groove; and
wherein the first annular surface further defines a spacing portion disposed at symmetrically opposite to the light incidence portion, wherein the first elongated grooves are arranged on two portions of the first annular surface located between the light incidence portion and the spacing portion.

2. The light guide ring unit of claim 1, wherein a length of the first elongated grooves gradually increases from the light incidence portion to the spacing portion.

3. The light guide ring unit of claim 1, wherein the first elongated grooves are evenly spaced from each other.

4. The light guide ring unit of claim 1, wherein each first elongated groove is V-shaped, semicircular, or semielliptical.

5. The light guide ring unit of claim 1, wherein the second groove is V-shaped, semicircular, or semielliptical.

6. The light guide ring unit of claim 1, wherein a refractive index of the light guide ring unit is about 1.489.

7. A backlight module, comprising:
a light source; and
a light guide ring unit comprising a first annular surface, a second annular surface opposite to the first annular surface and an inner side surface connecting the first annular surface and the second annular surface, wherein the first annular surface defines a plurality of first elongated grooves extending along a radius thereof, and the second annular surface defines a second groove extending along a radius thereof, the first annular surface receiving light from the light source, and the light is reflected by the inner walls of the second groove;
wherein the first annular surface defines a light incidence portion opposite to the second groove, and the first elongated grooves are arranged beside the light incidence portion; and
wherein the first annular surface further defines a spacing portion disposed at symmetrically opposite to the light incidence portion, and the first elongated grooves are arranged on two portions of the first annular surface located between the light incidence portion and the spacing portion.

8. The backlight module of claim 7, wherein a length of the first elongated grooves gradually increases from the light incidence portion to the spacing portion.

9. The backlight module of claim 7, wherein the first elongated grooves are evenly spaced apart.

10. The backlight module of claim 7, wherein each first elongated groove is V-shaped, semicircular, or semielliptical.

11. The backlight module of claim 7, wherein the second groove is V-shaped, semicircular, or semielliptical.

12. The backlight module of claim 7, further comprising a first reflecting plate, a second reflecting plate, and a third reflecting plate opposite to the first annular surface, the inner and outer circumferential edges of the third reflecting plate connecting the circumferential edge of the first reflecting plate and the second reflecting plate, respectively.

13. The backlight module of claim 7, further comprising a transparent plate opposite to the second annular surface, and the inner and outer circumferential edges of the transparent plate respectively connected to the circumferential edges of the first reflecting plate and the second reflecting plate.

14. The backlight module of claim 7, wherein a refractive index of the light guide ring unit is about 1.489.

* * * * *